United States Patent [19]

Serizawa et al.

[11] Patent Number: 5,227,427
[45] Date of Patent: Jul. 13, 1993

[54] POLYARYLENE SULFIDE RESIN COMPOSITION AND PROCESS FOR THE PREPARATION OF THE SAME

[75] Inventors: Hagime Serizawa, Mishima; Masaru Kubota, Fujinomiya; Hiroyuki Sano, Fuji, all of Japan

[73] Assignee: Polyplastics Co., Ltd., Osaka, Japan

[21] Appl. No.: 875,669

[22] Filed: Apr. 29, 1992

Related U.S. Application Data

[63] Continuation-in-part of Ser. No. 808,727, Dec. 17, 1991.

[30] Foreign Application Priority Data

Dec. 17, 1990 [JP] Japan ............................ 2-402708
Apr. 30, 1991 [JP] Japan ............................ 3-98857

[51] Int. Cl.$^5$ .................................................. C08K 9/00
[52] U.S. Cl. ............................................ 524/574; 524/579; 524/582; 524/584; 524/585; 524/586; 524/609; 525/189; 525/537
[58] Field of Search ................. 525/537, 189; 524/574, 524/584, 585, 579, 609

[56] References Cited

U.S. PATENT DOCUMENTS

| | | | |
|---|---|---|---|
| 4,528,346 | 7/1985 | Sugie et al. | 525/537 |
| 4,748,169 | 5/1988 | Izutsu et al. | 524/500 |
| 4,997,866 | 3/1991 | Nakata et al. | 523/512 |

FOREIGN PATENT DOCUMENTS

| | | |
|---|---|---|
| 0096122 | 12/1983 | European Pat. Off. |
| 0360544 | 3/1990 | European Pat. Off. |
| 0388971 | 9/1990 | European Pat. Off. |
| 0447668 | 12/1990 | European Pat. Off. |
| 59-207921 | 11/1984 | Japan |

*Primary Examiner*—John C. Bleutge
*Assistant Examiner*—Mark Sweet
*Attorney, Agent, or Firm*—Depaoli & O'Brien

[57] ABSTRACT

A polyarylene sulfide resin composition which yields a molded article having excellent surface appearance and excellent toughness and impact resistance comprises a blend of a polyarylene sulfide resin and a polyolefin resin with a compound having a carbon-carbon double bond and an epoxy group in its molecule. Optionally a radical initiator and a filler can be added to the composition.

19 Claims, No Drawings

POLYARYLENE SULFIDE RESIN COMPOSITION AND PROCESS FOR THE PREPARATION OF THE SAME

BACKGROUND OF THE INVENTION

This is a Continuation-in-part application of U.S. Ser. No. 07/808,727, filed Dec. 17, 1991.

The present invention relates to an improved polyarylene sulfide resin composition and a process for the preparation of the same. More particularly, the invention relates to a polyarylene sulfide resin composition having excellent impact resistance and heat resistance and which is prepared by blending a resin component comprising a polyarylene sulfide resin and a polyolefin resin with a specific compound containing a carbon-carbon double bond and an epoxy group and melt-kneading the obtained mixture.

Recently a thermoplastic resin which has high heat resistance and chemical resistance and excellent flame retardance has been demanded as the material of construction for components of electrical or electronic appliances, automobile parts and chemical instruments.

A polyarylene sulfide resin represented by polyphenylene sulfide is one of the resins satisfying this demand. Polyarylene sulfide is relatively inexpensive for its physical properties, so that the demand therefor has increased. However, polyarylene sulfide resin has a significant disadvantage in that it is poorer in toughness and is more brittle than other engineering plastics such as nylon, polycarbonate, polyacetal and polybutylene terephthalate.

The addition of a fibrous reinforcement such as glass fiber or carbon fiber or other filler has been known as an effective means for improving polyarylene sulfide resin with respect to various performances such as strengths, stiffness, toughness and heat resistance and for overcoming the above disadvantages. However, a composition prepared by adding such reinforcement to a polyarylene sulfide resin is still inferior to other engineering plastics with respect to toughness, so that the application of the composition in various fields is restricted, even though the composition has excellent chemical resistance, heat resistance and flame retardance.

Although blending a polyarylene sulfide resin with a flexible polymer is an effective method of improving the impact resistance of the resin, a polyarylene sulfide resin composition which has sufficiently improved mechanical and physical properties such as toughness and impact resistance without impairing the characteristics inherent in polyarylene sulfide resin has not yet been found. There are few polymers which are flexible and as well have excellent heat and chemical resistance and even those few polymers have poor compatibility with polyarylene sulfide resin. For example, polyolefin resin is one of the useful flexible polymers and blending a polyarylene sulfide resin with a polyolefin resin having a low specific gravity is a means of satisfying the demand to reduce the weight of automobile parts and so forth. However, a blend comprising a polyarylene sulfide resin and a polyolefin resin has poor compatibility between the resins, such that a molded article made therefrom has poor surface appearance and is liable to surface delamination. In order to solve this problem, for example, a process of adding a polyolefin resin modified with an epoxy compound or unsaturated carboxylic acid has been proposed (see Japanese Patent Laid-Open Nos. 213562/1988 and 26670/1989). However, the composition according to this process is still insufficient and, therefore, further improvement in the toughness and impact resistance of polyarylene sulfide resin is required.

SUMMARY OF THE INVENTION

The present invention aims at overcoming the above mentioned disadvantages with respect to a resin composition comprising a blend of a polyarylene sulfide resin and a polyolefin resin and thereby provide a molding material which has excellent mechanical properties such as toughness and impact resistance, exhibits excellent heat and chemical resistance and flame retardance and can yield a light-weight molded article having excellent surface appearance.

The inventors of the present invention have made intensive studies and have found that the compatibility of a polyarylene sulfide resin with a polyolefin resin can be remarkably improved without impairing the excellent characteristics inherent in polyarylene sulfide resin by adding to the blend a compound having a carbon-carbon double bond and an epoxy group in its molecule and melt-kneading the resins together to give a polyarylene sulfide resin composition satisfying the above requirements.

DETAILED DESCRIPTION OF THE INVENTION

Namely, the present invention relates to a polyarylene sulfide resin composition prepared by blending 100 parts by weight of a resin component consisting of (A) 99 to 20 parts by weight of a polyarylene sulfide resin and (B) 1 to 80 parts by weight of a polyolefin resin with (C) 0.1 to 15 parts by weight of a compound having a carbon-carbon double bond and an epoxy group in its molecule, (D) 0 to 20% by weight based on component (C) of a free radical initiator and (E) one or more fillers selected from among fibrous powdery, flaky and hollow fillers in an amount of 0 to 400 parts by weight per 100 parts by weight of the total amount of the components (A) and (B), and a process for the preparation of a polyarylene sulfide resin composition, which comprises melt-kneading a mixture comprising at least the components (A), (B) and (C) and, if necessary, component (D) under heating for at least 30 seconds.

The polyarylene sulfide resin to be used in the present invention as the component (A) is one mainly constituted of repeating units represented by the formula: —(Ar—S)— (wherein Ar is an arylene group).

Examples of the arylene group include p-phenylene, m-phenylene, o-phenylene and substituted phenylene groups (wherein the substituent is an alkyl group preferably having 1 to 5 carbon atoms or a phenyl group), p,p'-diphenylene sulfone, p,p'-biphenylene, p,p'-diphenylene ether, p,p'-diphenylenecarbonyl and naphthalene groups.

Although an arylene sulfide homopolymer constituted of the same repeating units among the arylene sulfide groups described above may be used in the present invention, the use of a copolymer constituted of a plurality of repeating units different from each other is preferable in some cases with respect to the processability of the resulting composition.

In particular, a substantially linear homopolymer composed of p-phenylene sulfide repeating units is preferably used.

The copolymer to be used in the present invention may be any one constituted of two or more repeating units different from each other selected from among the arylene sulfide units mentioned above. Particularly, a copolymer comprising p-phenylene sulfide units as a major component together with m-phenylene sulfide units is preferably used. More particularly, it is suitable with respect to heat resistance, moldability, mechanical characteristics and so on to use a substantially linear copolymer comprising at least 60 mole %, still preferably at least 70 mole % of p-phenylene sulfide units. Further, it is preferable that the copolymer contain 5 to 40 mole %, still preferably 10 to 25 mole % of m-phenylene sulfide units.

Among such copolymers, a block copolymer (for example, one disclosed in Japanese Patent Laid-Open No. 14228/1986) is preferred to a random one, because the former is superior to the latter in processability, heat resistance and mechanical properties.

Although the polyarylene sulfide resin to be used in the present invention as the component (A) may be either a relatively low-molecular weight linear polymer or a polymer having improved processability during molding by crosslinking such a relatively low-molecular weight linear polymer oxidatively or thermally to increase its melt viscosity, the polyarylene sulfide resin may also be a substantially linear high-molecular weight polymer prepared by the polycondensation of a monomer component mainly comprising a difunctional monomer. In many cases, the latter linear polymer is superior to the former with respect to the physical properties of the resulting molded article.

Further, a crosslinked polyarylene sulfide resin prepared from a monomer having at least three functional groups as a part of the monomer component or a blend of the above linear polymer with such a crosslinked polyarylene sulfide resin as well as the polymers described above can be suitably used in the present invention.

The polyolefin resin to be used in the present invention as the component (B) includes polyethylene, polypropylene, polymethylpentene, polybutylene, ethylene-propylene copolymers, ethylene-propylene-diene copolymers and other polymers. These polyolefin resins may be used either alone or as a mixture of two or more. In particular, the use of a polyolefin elastomer such as an ethylene-propylene copolymer or ethylene-propylene-diene copolymer is remarkably effective in improving the toughness of a polyarylene sulfide resin. It is preferred that the polyolefin resin have a flexural modulus of 5,000 kg/cm$^2$ or below.

Although the amount of the polyolefin resin to be used as the component (B) varies depending upon the objective physical properties, the polyarylene sulfide resin and the polyolefin resin are preferably used in amounts of 99 to 20 parts by weight and 1 to 80 parts by weight, respectively, still preferably in amounts of 95 to 50 parts by weight and 5 to 50 parts by weight, respectively. If the amount of the polyolefin resin is too small, the resulting composition will not have sufficiently improved toughness, while if the amount exceeds 80 parts by weight, the thermal deformation temperature of the resulting composition will be unfavorably lowered to a substantial degree.

The present invention is characterized by adding to the PAS resin blend a compound having a carbon-carbon double bond and an epoxy group in the compound molecule, for example, an epoxidized vinyl or allyl compound as the component (C). The compound having a carbon-carbon double bond and an epoxy group is preferably a monomeric compound having a boiling point of at least 150° C., still preferably at least 200° C. so as not to evaporate away during the melt kneading. Examples of the compound include allyl glycidyl ether, glycidyl acrylate, glycidyl methacrylate, glycidyl vinylbenzoate, glycidyl allylbenzoate, N-[4-(2,3-epoxypropoxy)-3,5-dimethylbenzyl]acrylamide, glycidyl cinnamate, glycidyl cinnamylideneacetate, chalcone glycidyl ether, N-diallylaminoepoxypropane, epoxyhexene, diglycidyl esters of dimer acids and esters of epoxidized stearyl alcohol with acrylic and methacrylic acids, and mixtures of two or more thereof. Glycidyl methacrylate, glycidyl vinylbenzoate, glycidyl allylbenzoate, N-[4-(2,3-epoxypropoxy)-3,5-dimethylbenzyl]acrylamide and N-diallylaminoepoxypropane are preferred.

The component (C) is used in an amount of 0.1 to 15 parts by weight, preferably 1 to 10 parts by weight per 100 parts by weight of the blend of polyarylene sulfide resin component (A) and polyolefin resin component (B). The amount of the component (C) to be added varies depending upon the kind of the component (C) and the application field of the resulting composition. If the amount is too small, the compatibility of the resins with each other and the toughness of the resulting composition will not be sufficiently improved, such that a molded article made from the composition will be liable to unfavorable surface delamination. If the amount of component (C) added is too large, the resulting composition will be too viscous and difficulties during molding or bleed-through will result.

Although the free radical initiator (D) is not necessarily an essential component in the composition of the present invention, the addition thereof is preferable for further improving the toughness of the composition. The free radical initiator (D) is not particularly limited, but may be any known one which generates a free radical at the melt-kneading temperature, for example, an azo or peroxide initiator. The free radical initiator is suitably one having a relatively high decomposition temperature, preferably a one-minute half-life temperature of at least 130° C., still preferably at least 150° C. The free radical initiator preferably from this standpoint includes 2,5-dimethylhexane-2,5-dihydroperoxide, di-t-butylperoxide, t-butyl cumyl peroxide, 2,5-dimethyl-2,5-di(t-butylperoxy)hexane, 2,5-dimethyl-2,5-di(t-butylperoxy)hexyne-3, n-butyll-4,4-bis(t-butylperoxy) valerate, 2,3-dimethyl-2,3-diphenylbutane, 2,3-diethyl-2,3-diphenylbutane, 2,3-dimethyl-2,3-di(p-methylphenyl)butane and 2,3-dimethyl-2,3-di(bromophenyl)-butane, as well as mixtures thereof.

The free radical initiator (D) is used in an amount of 0 to 20% by weight, preferably, 0.1 to 10% by weight, based on the amount of component (C). Although the amount of the radical initiator to be added varies depending upon the kind of the initiator and the application field of the resulting composition, the use thereof in too large an amount is unfavorable because the resulting composition will be liable to bubbling during melt-kneading and expand during melt molding.

Although the filler (E) is also not necessarily an essential component in the composition of the present invention, the use thereof is preferable for producing a molded article which has excellent mechanical strengths, heat resistance, dimensional stability, electrical properties and other performances. The filler (E) may be selected from among fibrous, powdery, flaky and hollow ones.

The fibrous filler includes inorganic fibrous materials, for example, glass fiber, asbestos fiber, carbon fiber, silica fiber, silica/alumina fiber, zirconia fiber, boron nitride fiber, silicon nitride fiber, boron fiber and potassium titanate fiber, and fibers of metals such as stainless steel, aluminum, titanium, copper or brass. Among them, glass fiber and carbon fiber are most representative. Further, the fibrous filler includes high-melting organic fibrous materials, for example, polyamides, fluororesins and acrylic resins.

The powdery filler includes carbon black, silica, quartz powder, glass bead, glass powder, silicates such as calcium silicate, aluminum silicate, kaolin, talc, clay, diatomaceous earth and wollastonite; metal oxides such as iron oxide, titanium oxide and alumina; metal carbonates such as calcium carbonate and magnesium carbonate; metal sulfates such as calcium sulfate and barium sulfate; silicon carbide, silicon nitride, boron nitride and various metal powders.

The flaky filler includes mica, glass flake and various metal foils.

The hollow filler includes "shirasu" (a white arenaceous sediment) balloon, metal balloon and glass balloon.

It is preferable that these fillers be surface-treated with an organic silane, an organic borane, an organic titanate and the like prior to the use.

These inorganic fillers may be used alone or as a mixture of two or more thereof. The simultaneous use of a fibrous filler, particularly glass or carbon fiber with a powdery or flaky filler is particularly effective in producing an article which has excellent mechanical strengths, dimensional accuracy and electrical properties.

The amount of the inorganic filler is at most 400 parts by weight per 100 parts by weight of the blend of resins (A) and (B). If the amount exceeds 400 parts by weight, the resulting composition will have poor processability during molding and poor toughness. The use thereof in an amount of 250 parts by weight or below is particularly preferable.

The composition of the present invention may auxiliarily contain a small amount of other thermoplastic resins such as polyvinyl chloride, polyvinylidene chloride, polycarbonate, polyester or polyamide resin or a natural or synthetic rubber, as long as the use thereof does not deviate from the objects of the present invention. Further, the composition may contain the conventional additives and examples thereof include flame retardant, antioxidant, ultraviolet absorber, lubricant, mold release agent, nucleating agent, foaming agent, crosslinking agent, colorant and so forth.

Although the composition of the present invention can be prepared by various known processes, a mixture comprising at least the three components (A), (B) and (C), if desired, component (D) must be heat-melted and kneaded for at least 30 seconds. The component (E) and other components may be added either in this heat melting-kneading step together with the above components or in other steps. For example, the composition can be prepared by homogeneously mixing the components (A), (B), (C) and, if desired, (D) and/or (E) together with a mixing machine such as a tumbler or Henschel mixer and melt-kneading the obtained mixture with a single- or twin-screw extruder to obtain pellets. In this preparation, it is preferable to employ a process which comprises preliminarily preparing a solution of the components (C) and (D), adding this solution to a powdery mixture of the components (A) and (B) and drying the obtained mixture, and subjecting the resulting mixture to the above melt-kneading. This process is particularly effective in homogeneously dispersing the component (D) which is used in a small amount in the present invention. However, the composition need not necessarily be prepared by the above process, but may be prepared by any process, so long as the components can be homogeneously dispersed with each other. Further, the component (E) and others may be added either in the course of the melt kneading or thereafter.

The melt-kneading is conducted at a temperature higher than the melting point of the resin component by 5° to 100° C., preferably 10° to 60° C. The melt-kneading at too high a temperature causes unfavorable decomposition and abnormal reactions. Although the melt-kneading time varies depending upon the kneading temperature or the kinds or amounts of the components (C) and (D), it is 30 seconds to 15 minutes, preferably 1 to 10 minutes.

Although the details of the mechanism by which the resin composition of the present invention is improved in toughness have not been sufficiently elucidated, it is inferred that a polyarylene sulfide resin might be bonded to a polyolefin resin through the component (C) to enhance the compatibility of the resins with each other, thus giving a composition having high toughness.

As understood from the above description and the Examples which will be described below, the polyarylene sulfide resin composition of the present invention has improved dispersibility of the components with each other to exhibit remarkably improved toughness and impact resistance while retaining the excellent heat and chemical resistances and flame retardance inherent in polyarylene sulfide resin, thus being useful as a molding material which can provide a molded article having excellent appearance.

EXAMPLES

The present invention will now be described in more detail by referring to the following Examples though the present invention is not limited by them. Examples 1 to 8 and Comparative Examples 1 and 2

70 parts by weight of a polyphenylene sulfide resin (PPS) (a product of Kureha Chemical Industry Co., Ltd., "Fortlon KPS") as the component (A), 30 parts by weight of an ethylene-propylene copolymer (EPR) (a product of Japan Synthetic Rubber Co., Ltd., EP912P) as the component (B) and a 10% solution of N-[4-(2,3-epoxypropoxy)-3,5-dimethylbenzylacrylamide (C-1) as the component (C) and, if necessary, 2,5-dimethyl-2,5-di(t-butylperoxy)hexane (D-1) as the component (D) in acetone were blended together and freed from the solvent, followed by, if necessary, the addition of a glass fiber (chopped strand having a diameter of 10 μm and a length of 3 mm) as the component (E), the amounts of the components used being specified in Table 1. The obtained blend was premixed on a Henschel mixer for 5 minutes and melt-kneaded on an extruder at a cylinder temperature of 310° C. (residence time: about 2 minutes) to give pellets of a polyphenylene sulfide resin composition.

The pellets were molded into an ASTM test piece on an injection molding machine at a cylinder temperature of 290° C. and a mold temperature of 150° C. This test piece was subjected to tensile and impact tests and examined for thermal deformation temperature (under a load of 18.0 kg). Further, the surface appearance of the tensile test piece was evaluated by the observation with the naked eye.

The results are given in the Table 1. Examples 9 to 11 and Comparative Examples 3 to 9

The results are given in the Table 2. Examples 12 to 15 and Comparative Examples 10 to 13

The same procedures as those of the Examples 4 and 9 to 11 and the Comparative Examples 1 and 3 to 7 were each repeated except that a glass fiber (E) was further added at a ratio specified in Table 3.

The results are given in the Table 3. Examples 16 to 20 and Comparative Examples 14 to 18.

TABLE 1

| | | Comp. Ex. 1 | Ex. 1 | Ex. 2 | Ex. 3 | Ex. 4 | Ex. 5 | Ex. 6 | Comp. Ex. 2 | Ex. 7 | Ex. 8 |
|---|---|---|---|---|---|---|---|---|---|---|---|
| Composn. (pt. by wt.) | (A) PPS resin | 70 | 70 | 70 | 70 | 70 | 70 | 70 | 70 | 70 | 70 |
| | (B) EPR | 30 | 30 | 30 | 30 | 30 | 30 | 30 | 30 | 30 | 30 |
| | (C) C-1 | — | 0.5 | 3 | 10 | 3 | 3 | 3 | — | 3 | 3 |
| | (D) D-1 (% by wt. based on (C)) | — | 0.5 | 0.5 | 0.5 | — | 5 | 10 | — | — | 0.5 |
| | (E) glass fiber | — | — | — | — | — | — | — | 67 | 67 | 67 |
| Physical properties | tensile strength [kgf/cm$^2$] | 360 | 370 | 390 | 395 | 370 | 390 | 396 | 1300 | 1600 | 1700 |
| | tensile elongation [%] | 15 | 15 | 16 | 40 | 15 | 17 | 20 | 6 | 9 | 11 |
| | Izod impact notched | 2.6 | 4.3 | 7.5 | 9.0 | 6.5 | 7.6 | 8.9 | 5.3 | 10.0 | 11.5 |
| | strength unnotched [kgcm/cm] | 25 | 48 | 77 | 85 | 60 | 80 | 84 | 28 | 61 | 67 |
| | thermal deformation temp. [°C.] (under load of 18.6 kg) | 93 | 93 | 92 | 91 | 92 | 92 | 92 | 253 | 252 | 252 |
| | surface appearance | bad | good | good | good | good | good | good | bad | good | good |

TABLE 2

| | | Comp. Ex. 3 | Ex. 9 | Comp. Ex. 1 | Ex. 4 | Comp. Ex. 4 | Ex. 10 | Comp. Ex. 5 | Ex. 11 | Comp. Ex. 6 | Comp. Ex. 7 | Comp. Ex. 8 | Comp. Ex. 9 |
|---|---|---|---|---|---|---|---|---|---|---|---|---|---|
| Composn. (pt. by wt.) | (A) PPS resin | 90 | 90 | 70 | 70 | 50 | 50 | 30 | 30 | 100 | 100 | — | — |
| | (B) EPR | 10 | 10 | 30 | 30 | 50 | 50 | 70 | 70 | — | — | 100 | 100 |
| | (C) C-1 | — | 3 | — | 3 | — | 3 | — | 3 | — | 3 | — | 3 |
| Physical properties | tensile strength [kgf/cm$^2$] | 600 | 628 | 360 | 370 | 300 | 310 | 280 | 300 | 650 | 650 | 25 | 26 |
| | tensile elongation [%] | 16 | 23 | 15 | 15 | 80 | 100 | 130 | 150 | 1.9 | 1.8 | >300 | >300 |
| | Izod impact strength notched [kgcm/cm] | 3.0 | 5.1 | 2.6 | 6.5 | 6.5 | 9.0 | 8.5 | 11.5 | 1.0 | 1.2 | NB*1 | NB*1 |
| | un-notched | 39 | 57 | 25 | 60 | 65 | 100 | 80 | 125 | 5 | 9 | NB*1 | NB*1 |
| | thermal deformation temp. [°C.] (under load of 18.6 kg) | 102 | 100 | 93 | 92 | 85 | 83 | 72 | 71 | 116 | 116 | below room. temp. | below room temp. |
| | surface appearance | bad | good | bad | good | bad | good | bad | good | good | good | good | good |

(note)
*1NB: not broken

TABLE 3

| | | Comp. Ex. 10 | Ex. 12 | Comp. Ex. 2 | Ex. 7 | Comp. Ex. 11 | Ex. 13 | Comp. Ex. 12 | Ex. 14 | Comp. Ex. 13 | Ex. 15 |
|---|---|---|---|---|---|---|---|---|---|---|---|
| Composn. (pt. by wt.) | (A) PPS resin | 90 | 90 | 70 | 70 | 50 | 50 | 30 | 30 | 100 | 100 |
| | (B) EPR | 10 | 10 | 30 | 30 | 50 | 50 | 70 | 70 | — | — |
| | (C) C-1 | — | 3 | — | 3 | — | 3 | — | 3 | — | 3 |
| | (D) D-1 (% by wt. based on (C)) | — | — | — | — | — | — | — | — | — | — |
| | (E) glass fiber | 67 | 67 | 67 | 67 | 67 | 67 | 67 | 67 | 67 | 67 |
| Physical properties | tensile strength [kgf/cm$^2$] | 1700 | 1750 | 1300 | 1600 | 1500 | 1550 | 1000 | 1200 | 1700 | 1720 |
| | tensile elongation [%] | 3 | 5 | 6 | 9 | 8 | 15 | 20 | 25 | 1.4 | 1.4 |
| | Izod impact strength notched [kgcm/cm] | 4.0 | 8.0 | 5.3 | 10.0 | 8.5 | 15.0 | 20.0 | 30.0 | 4.0 | 5.0 |
| | unnotched | 25 | 30 | 28 | 61 | 80 | 100 | NB | NB | 20 | 30 |
| | surface appearance | bad | good | bad | good | bad | good | bad | good | good | good |

The same PPS resin (A), EPR resin (B) and N-[4-(2,3-epoxypropoxy)-3,5-dimethylbenzyl]acrylamide (C) (C-1) as those used in the foregoing Examples and Comparative Examples were blended together at a ratio specified in Table 2 and the obtained composition was evaluated in a similar manner to that of the Examples and Comparative Examples.

The same procedure as those of the Example 4 and the Comparative Example 1 were each repeated except that the EPR resin (B) was replaced by polyethylene (PE) (a product of Mitsui Petrochemical Industries, Ltd.; Hizex 2100J), polypropylene (PP) (a product of Sumitomo Chemical Co., Ltd.; Noblen X101A), polymethylpentene (PMP) (a product of Mitsui Petrochemical Industries, Ltd.; TPX RT18XB), EPDM resin (a product of Japan Synthetic Rubber Co., Ltd.; EP181SP) or polybutene-1 (a product of Mitsui Petrochemical Industries, Ltd.; Polybutene MO400) in an amount specified in Table 4.

The results are given in the Table 4.

Examples 21 to 25

The same procedure as that of the Example 2 was repeated except that the compound (C-1) was replaced by glycidyl methacrylate (C-2) or N-diallylaminoepoxypropane (C-3) and the compound (D-1) was replaced by 2,5-dimethyl-2,5-di(t-butylperoxy)hexyne-3 (D-2), 2,3-dimethyl-2,3-diphenylbutane (D-3) or 2,5-dimethylhexane-2,5-dihydroperoxide (D-4).

The results are given in Table 5.

TABLE 4

|  |  |  | Comp. Ex. 14 | Ex. 16 | Comp. Ex. 15 | Ex. 17 | Comp. Ex. 16 | Ex. 18 | Comp. Ex. 17 | Ex. 19 | Comp. Ex. 18 | Ex. 20 |
|---|---|---|---|---|---|---|---|---|---|---|---|---|
| Composn. (pt. by wt.) | (A) PPS resin | | 70 | 70 | 70 | 70 | 70 | 70 | 70 | 70 | 70 | 70 |
| | (B) | PE | 30 | 30 | — | — | — | — | — | — | — | — |
| | | PP | — | — | 30 | 30 | — | — | — | — | — | — |
| | | PMP | — | — | — | — | 30 | 30 | — | — | — | — |
| | | EPDM | — | — | — | — | — | — | 30 | 30 | — | — |
| | | Polybutene-1 | — | — | — | — | — | — | — | — | 30 | 30 |
| | (C) C-1 | | — | 3 | — | 3 | — | 3 | — | 3 | — | 3 |
| | (D) D-1 | | — | — | — | — | — | — | — | — | — | — |
| | (% by wt. based on (C)) | | | | | | | | | | | |
| Physical properties | tensile strength [kgf/cm$^2$] | | 450 | 470 | 495 | 510 | 440 | 460 | 296 | 354 | 375 | 390 |
| | tensile elongation [%] | | 13 | 21 | 7 | 12 | 8 | 13 | 18 | 44 | 18 | 33 |
| | Izod impact strength notched | | 2.2 | 3.8 | 2.1 | 3.7 | 1.9 | 3.5 | 1.3 | 4.8 | 2.7 | 5.7 |
| | [kgcm/cm] unnotched | | 21 | 44 | 18 | 41 | 16 | 39 | 15.2 | 111.9 | 28 | 66 |
| | appearance | | bad | good | bad | good | bad | good | bad | good | bad | good |

TABLE 5

|  |  |  | Comp. Ex. 1 | Ex. 2 | Ex. 21 | Ex. 22 | Ex. 23 | Ex. 24 | Ex. 25 |
|---|---|---|---|---|---|---|---|---|---|
| Composn. (pt. by wt.) | (A) PPS resin | | 70 | 70 | 70 | 70 | 70 | 70 | 70 |
| | (B) EPR | | 30 | 30 | 30 | 30 | 30 | 30 | 30 |
| | (C) | C-1 | — | 3 | 3 | 3 | 3 | — | — |
| | | C-2 | — | — | — | — | — | 3 | — |
| | | C-3 | — | — | — | — | — | — | 3 |
| | (D) | D-1 | — | 0.5 | — | — | — | 0.5 | 0.5 |
| | (% by wt. based on (C)) | D-2 | — | — | 0.5 | — | — | — | — |
| | | D-3 | — | — | — | 0.5 | — | — | — |
| | | D-4 | — | — | — | — | 0.5 | — | — |
| Physical properties | tensile strength [kgf/cm$^2$] | | 360 | 390 | 385 | 370 | 375 | 380 | 378 |
| | tensile elongation [%] | | 15 | 16 | 16 | 16 | 16 | 16 | 16 |
| | Izod impact strength notched | | 2.6 | 7.5 | 7.3 | 7.0 | 7.1 | 6.5 | 6.6 |
| | [kgcm/cm] unnotched | | 25 | 77 | 74 | 66 | 72 | 63 | 65 |
| | appearance | | bad | good | good | good | good | good | good |

What is claimed is:

1. A polyarylene sulfide resin composition prepared by blending 100 parts by weight of a resin component consisting essentially of
   (A) 99 to 20 parts by weight of a polyarylene sulfide resin and
   (B) 1 to 80 parts by weight of a polyolefin resin, with
   (C) 0.1 to 15 parts by weight of a monomeric compound having a carbon-carbon double bond and an epoxy group in its molecule,
   (D) 0 to 20% by weight based on the component (C) of a free radical initiator and
   (E) one or more fillers selected from among fibrous, powdery, flaky and hollow fillers in an amount of 0 to 400 parts by weight per 100 parts by weight of the total amount of the components (A) and (B).

2. The polyarylene sulfide resin composition as set forth in claim 1, wherein said component (C) has a boiling point of 150° C. or above.

3. The polyarylene sulfide resin composition as set forth in claim 2, wherein said component (C) has a boiling point of at least 200° C.

4. The polyarylene sulfide resin composition as set forth in claim 1, wherein said component (C) is selected from the group consisting of glycidyl methacrylate, glycidyl vinylbenzoate, glycidyl allylbenzoate, N-[4-(2,3-epoxypropoxy)-3,5-dimethylbenzyl]acrylamide and N-diallylaminoepoxypropane.

5. The polyarylene sulfide resin composition as set forth in claim 1, wherein said component (D) is a free radical initiator having a one-minute half-life temperature of at least 130° C.

6. The polyarylene sulfide resin composition as set forth in claim 5, wherein said component (D) is a free radical initiator having a one-minute half-life temperature of at least 150° C.

7. The polyarylene sulfide resin composition as set forth in claim 1, wherein said component (B) is a polyolefin resin having a flexural modulus of 5,000 kg/cm$^2$ or below.

8. The polyarylene sulfide resin composition as set forth in claim 1, wherein said component (E) is present in amounts of up to 250 parts by weight per 100 parts by weight of the total amount of components A and B.

9. The polyarylene sulfide resin composition as set forth in claim 1, wherein said resin component comprises 95 to 50 parts by weight of component A and 5 to 50 parts by weight of component B.

10. The polyarylene sulfide resin composition as set forth in claim 1, wherein said component (C) is present in amounts of 1 to 10 parts by weight per 100 parts by weight of the total amount of components (A) and (B).

11. The polyarylene sulfide resin composition as set forth in claim 1, wherein said component (D) is a present in amounts of 0.1 to 10% by weight based on the amount of compound (C).

12. The polyarylene sulfide resin composition as set forth in claim 1, wherein said component (A) comprises a substantially linear homopolymer composed of p-phenylene sulfide repeating units.

13. The polyarylene sulfide resin composition as set forth in claim 1, wherein said polyarylene sulfide resin (A) comprises a copolymer formed of p-phenylene sulfide units and m-phenylene sulfide units.

14. The polyarylene sulfide resin composition as set forth in claim 1, wherein said polyolefin resin (B) is selected from the group consisting of polyethylene, polypropylene, polymethylpentene, polybutylene, ethylene-propylene copolymers, ethylene-propylene-diene copolymers.

15. The polyarylene sulfide resin composition as set forth in claim 14, wherein said polyolefin resin (B) comprises ethylene-propylene copolymer.

16. The polyarylene sulfide resin composition as set forth in claim 14, wherein said polyolefin resin (B) comprises polyethylene.

17. The polyarylene sulfide resin composition as set forth in claim 1, wherein said component (A) comprises polyphenylene sulfide.

18. The polyarylene sulfide resin composition as set forth in claim 13 wherein said copolymer of polyarylene sulfide resin (A) comprises 60 to 95 mole % of said p-phenylene sulfide units and 5 to 40 mole % of said m-phenylene sulfide units.

19. The polyarylene sulfide resin composition as set forth in claim 19 wherein said copolymer of polyarylene sulfide resin (A) comprises 70 to 90 mole % of said p-phenylene sulfide units and 10 to 25 mole % of said m-phenylene sulfide units.

* * * * *